United States Patent [19]
Hall et al.

[11] Patent Number: 5,306,372
[45] Date of Patent: Apr. 26, 1994

[54] ADHESIVE-COATED WRAPPING PAPER

[76] Inventors: Nancy E. Hall, 4525-H Sharon Chase Dr., Charlotte, N.C. 28215; Robert C. Economos, 8608 Beeswood Dr., Charlotte, N.C. 28277

[21] Appl. No.: 989,759

[22] Filed: Dec. 14, 1992

[51] Int. Cl.⁵ .............................. B32B 31/00
[52] U.S. Cl. ..................... 156/213; 156/217
[58] Field of Search ............ 428/343, 40, 355, 4; 156/213, 217

[56] References Cited
U.S. PATENT DOCUMENTS

| | | | |
|---|---|---|---|
| 732,889 | 7/1903 | Paver | 428/343 |
| 2,185,470 | 1/1940 | MacDonald | 428/355 |
| 2,529,060 | 11/1950 | Trillich | 428/355 |
| 2,676,897 | 4/1954 | Trillich | 428/355 |
| 4,101,032 | 7/1978 | Obidniak | 428/40 |
| 4,810,745 | 3/1989 | Pike | 428/355 |
| 4,826,712 | 5/1989 | Theno | 428/4 |
| 4,863,537 | 9/1989 | Sadri | 428/343 |

Primary Examiner—Jenna L. Davis
Attorney, Agent, or Firm—Clifton Ted Hunt

[57] ABSTRACT

Adhesive-coated wrapping paper is provided wherein one surface of the paper, to be positioned against a box or article to be wrapped, is provided with a continuous coating of adhesive, preferably at the time of manufacture, to facilitate the forming of a package by wrapping the paper around the box or article. The adhesive is preferably of the type having a relatively small amount of adhesion, such as the type commonly known as artist's adhesive.

1 Claim, 1 Drawing Sheet

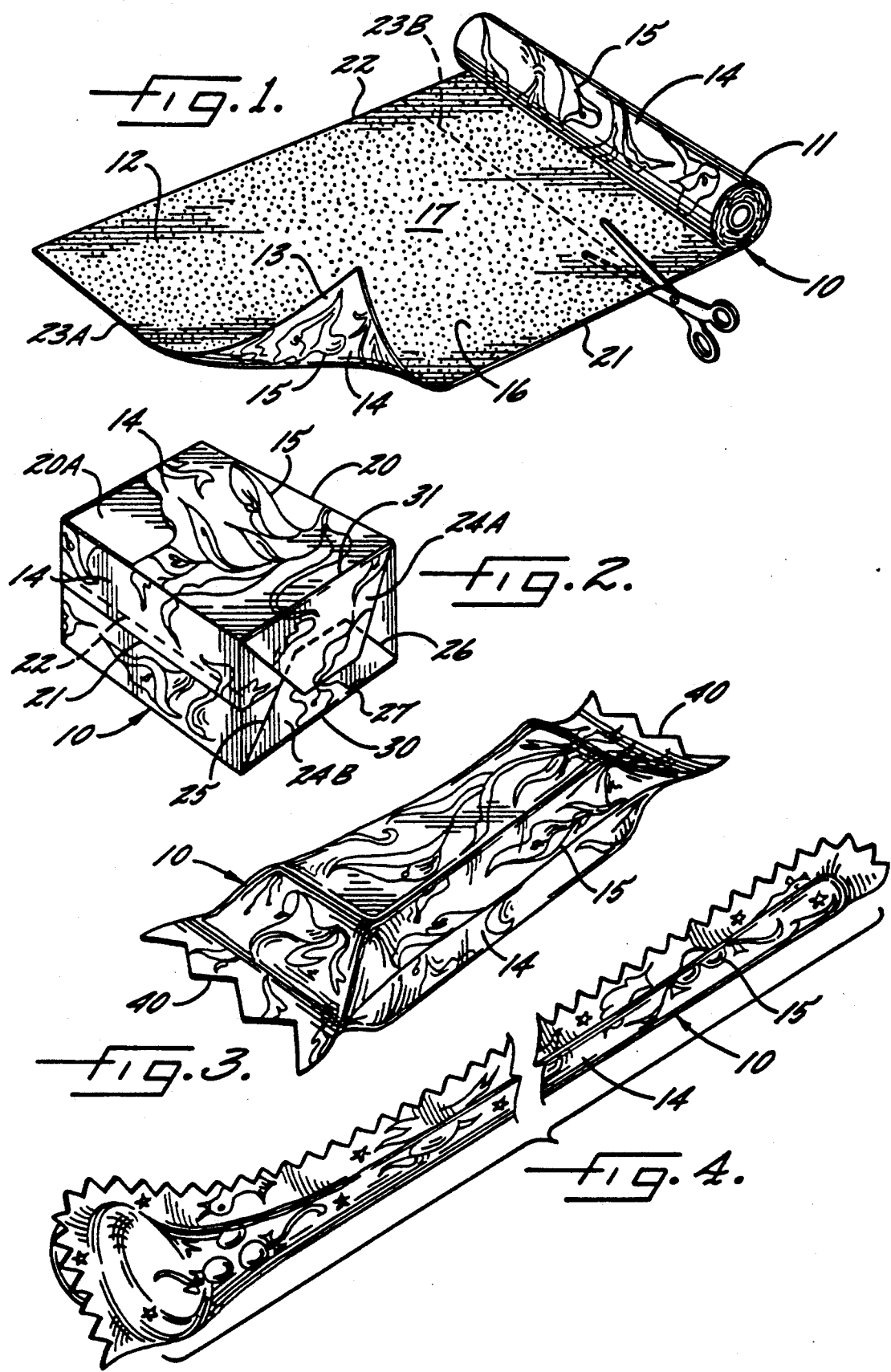

ADHESIVE-COATED WRAPPING PAPER

FIELD OF THE INVENTION

This invention relates to decorative and plain wrapping paper of the type used for wrapping packages.

BACKGROUND OF THE INVENTION

The use of paper for wrapping packages has long been known. After the paper is wrapped around the package, it is customary to fasten the paper about the package with fastening means, as by string tied around the wrapped package, or by securing the paper in place with tape of the type sold by Minnesota Mining and Manufacturing Company of St. Paul, Minn. under the trademark SCOTCH TAPE.

The conventional manner of wrapping packages with the use of string or tape requires a measure of labor and of skill which is not possessed by everyone. For the unskilled, the attractive wrapping of packages is a task that is frequently relegated to professionals in the gift wrapping department.

Patent Number Re. 26,742 issued Dec. 16, 1969 to Frederick H. Laskow is exemplary of the attempted prior art solutions to the problem of effectively and attractively securing in place paper wrapped about a box or other article. Laskow provides a box and wrapping paper for the box, the wrapping paper comprising panels conforming with the structure of the box and selected panels of the box including a single narrow area of pressure sensitive adhesive covered by a protective strip.

Laskow teaches that the conforming panels of the wrapping paper may be formed about their corresponding parts of the box, after which the protective strips may be removed from the adhesive means and the adhesive used to secure the wrapping paper to the box The teaching of Laskow simplifies the wrapping of packages but has the disadvantages of requiring the labor and facilities to position the adhesive in spaced locations and to form each sheet of wrapping paper in conformance with the size and shape of a specific box. The need to match the wrapping paper with the size and shape of the box needed to pack the article to be packaged is a disadvantage to the user. These disadvantages are overcome by the present invention.

SUMMARY OF THE INVENTION

The adhesive-coated wrapping paper of the present invention may be plain paper, plastic, or other desired sheet material suitable for wrapping packages. One surface may have a decorative pattern as is common in wrapping paper intended for wrapping gifts. As used herein the term "paper" includes not only paper but also plastic and all other materials which may be used to wrap packages.

According to the invention, the surface of the paper that will go against a box or other article is uniformly coated with adhesive. It has been surprisingly found that a type of adhesive, commonly known as artist's adhesive, designed for short-term or temporary bonding, as for making layouts, photo composition work and negative preparation, provides an adequate amount and duration of adhesion for satisfactorily wrapping packages.

One such adhesive, which has been found satisfactory, is manufactured and sold by Minnesota Mining and Manufacturing, 3M Adhesives Systems, Industrial Specialties Division, St. Paul, Minn. 55144-1000 under the trademark SPRAY MOUNT. It is identified within the company as Product Number 62-6065-4826-1. Any adhesive that provides a comparable amount and duration of adhesion may be satisfactorily used in practicing the invention. More specifically, the adhesion of the preferred adhesive is light enough to the paper to be removed from the article to correct mistakes while wrapping, and strong enough to reliably hold the paper in place after the article is satisfactorily wrapped. Adhesive which provides an adequate amount and duration of adhesion for successfully practicing the invention is referred to hereinafter as releasable adhesive.

In manufacturing the adhesive-coated wrapping paper of this invention, one surface of the paper may be coated with releasable adhesive before the paper is cut, or the paper may be cut in any desired size, such as in sheets that are two feet wide and six feet long, and then coated on one surface with releasable adhesive. The adhesive-coated wrapping paper is then rolled on a core and packaged for shipping.

As the adhesive-coated wrapping paper is being unrolled for use, the adhesive-coated surface of the paper adheres to the uncoated surface of the paper, but the adhesion provided by releasable adhesive is light enough that the two surfaces may be easily separated without damage to the paper as a selected amount of paper is unrolled to wrap a package.

BRIEF DESCRIPTION OF THE DRAWINGS

FIG. 1 is a perspective view illustrating the unrolling and separation from a roll of adhesive-coated wrapping paper of a desired amount of paper for wrapping a selected package;

FIG. 2 is a perspective view, with parts broken away, illustrating the usual way of folding wrapping paper about a box to form a package; and FIGS. 3 and 4 are perspective views illustrating alternative ways of wrapping packages with the adhesive-coated wrapping paper of this invention.

DETAILED DESCRIPTION OF THE INVENTION

Referring more specifically to the drawings, the adhesive-coated wrapping paper is broadly indicated at 10. In FIG. 1, a portion 11 of the paper 10 is shown as being rolled on a core for shipment and storage. A portion 12 of the paper 10 has been unrolled for use in wrapping a package.

In the illustrated embodiment, as can be seen on the turned back corner 13 in FIG. 1, the outer surface 14 of the paper 10 may be decorated or ornamented as at 15, for wrapping gifts. If desired, the outer surface 14 need not be decorated but may be plain or unornamented within the spirit of the invention.

The inner surface 16 of the entire roll of adhesive-coated paper 10, including the unrolled flat portion 12, is coated with adhesive 17. The adhesive 17 is preferably applied during the manufacturing process of the paper but can be applied at any time before using the paper to wrap a package.

The adhesive 17 is preferably of the type known as artist's adhesive, as previously explained in the foregoing summary of the invention. The adhesion of such adhesive (releasable adhesive) to paper is very light as compared with the strong adhesion to paper of the adhesive in the aforesaid SCOTCH TAPE. The adhesion of releasable adhesive to paper is also less than the adhesion to paper of the adhesive in the product sold under the trademark POST-IT by Minnesota Mining and Manufacturing Company of St. Paul, Minn.

It is known that the adhesion of releasable adhesive to paper is light enough to permit easy separation, without damage to the paper, of two pieces of paper that are adhered together with releasable adhesive. It has been found that the adhesion of releasable adhesive is sufficiently strong for the end use of holding in place paper that has been wrapped around and folded in place about a box to form a package, such as indicated at 20 in FIG. 2. Of course, adhesives with stronger adhesion, such as used in the aforesaid SCOTCH TAPE and POST-IT products, are also strong enough to hold in place paper that has been wrapped around an article and folded in place to form a package. Adhesives with stronger adhesion than that of releasable adhesive can be used in practicing the invention of uniformly coating one surface of wrapping paper with adhesive, if desired, but releasable adhesive is preferred because, when used in accordance with the invention, the light adhesion of releasable adhesive facilitates the wrapping of packages.

For example, the package 20 in FIG. 2 includes a box 20A of a typical shape that is wrapped in a typical fashion. A sheet of appropriately sized adhesive-coated paper 10, such as the portion 12 in FIG. 1, is shown to be wrapped around the box 20A in the usual way as by placing the wrapping paper on a suitable surface (not shown) with the inner surface of the paper facing upwardly. The box 20A to be wrapped is placed on the paper with the top of the box against the inner surface and with the edges of the box in desirably spaced relation to the edges of the paper.

In the illustrated embodiment, the adhesive 17 extends throughout the inner surface 16 of the paper 10. The continuous coverage of adhesive 17 on the surface 16 enables the paper 10 to be effectively used to wrap any size and shape of article. It is recognized that closely spaced areas of adhesive, such as dots or strips of adhesive, can be satisfactorily used to wrap any size and shape of article. Accordingly, as used herein, the term "continuous" means complete coverage of adhesive on one surface of the paper and also means closely spaced areas of adhesive on one surface of the paper that effectively enable the wrapping of any size and shape of article.

In wrapping the package 20, that portion of the adhesive 17 contacted by the top of the box 20A lightly adheres the paper 10 to the top of the box. The paper extending beyond the box is then folded about the box with the longitudinal edge 21 of the paper 10 overlapping the longitudinal edge 22 of the paper 10 along one side and beyond the ends of the box.

As the paper 10 is wrapped around the box to bring the longitudinal edges 21 and 22 into overlapping relation, the adhesive 17 on the inner surface 16 is pressed against the box during the wrapping operation and adheres the paper to the box. This secures the paper to the box and enhances the appearance of the package. When the outer edge 21 is positioned over the inner edge and pressed in place, the adhesive 17 adheres the two edge portions adjoining longitudinal edges 21 and 22 together along the side of the box shown in FIG. 2.

The transverse ends 23A and 23B and proximal portions of the longitudinal edge portions extending inwardly from the edges 21 and 22 of the paper 10 are folded into overlapping flaps 24A and 24B across both ends of the box. The flap 24B in FIG. 2 is formed by folding the longitudinal edge portions inwardly toward each other at an angle along the lines 25 and 26, with the adhesive 17 on the longitudinal edge portions of the paper overlapping about two thirds of the adhesive 17 on the transverse end portions of the paper 10, exposing the adhesive 17 on the central portion of the transverse end portion 27. The transverse end portion 27 is then folded upwardly from the bottom edge 30 of the box and pressed against the end of the box. The exposed adhesive 17 on the inner surface of its central portion adheres the flap 24B to the end of the box.

The flap 24A is formed in the same manner as the flap 24B and then folded downwardly from the top edge 31 of the box and pressed in overlapping relation against the flap 24B. The adhesive 17 on the inner surface of the central portion of flap 24A adheres that flap to the outer surface of the flap 24B.

The package 20 is thus formed without the need for fastening means, such as string and tape, to hold the paper in place about the box. The adhesion provided by the adhesive 17 is light enough to be removable to correct a mistake made in positioning the paper about the box, and is strong enough to reliably hold the paper in place when the box is satisfactorily wrapped and the paper pressed in place.

FIG. 3 illustrates another way to use the adhesive-coated wrapping paper to wrap a package. Instead of making the conventional flaps at the ends of the packages, as in FIG. 2, the transverse ends of the paper extend beyond the ends of the box, not shown, with the inner surfaces of the overlapped paper at the ends of the box engaging each other and the adhesive 17 on the inner surface of the paper holding the paper together.

A pair of scissors may be used to form the serrated edges 40 and 41, or other design, in the overlapping ends of the paper 10 at the ends of the package.

FIG. 4 illustrates the ease of using the adhesive-coated wrapping paper to form a distinctive package. In the illustrated example, the adhesive 17 on the inner surface of the paper 10 is placed against an article with an irregular shape, such as a golf club, and the paper is wrapped to enclose the article and to extend longitudinally and transversely beyond the article, with the adhesive 17 on the inner surface of the paper holding together the longitudinal and transverse edge portions of the paper that extend outwardly beyond the article. Serrations or other designs may be formed with scissors in the overlapping portions of the paper.

There is thus provided an improved wrapping paper with an adhesive coating on the surface to be placed against an article being wrapped, or against a surface to be decorated, such as a door at Christmastime. The adhesive coating also extends with the paper beyond the wrapped article to be folded against the wrapped article or distinctively decorated, as desired.

I claim:

1. A method of wrapping an article to form a package, said method comprising the steps of:
   (a) providing a sheet of paper large enough to wrap about the article and having one surface to be the inner surface and a second surface to be the outer surface when the sheet of paper is wrapped about an article to form a package;
   (b) applying a coating of releasable adhesive substantially throughout the one surface of the paper to be placed against the article when it is wrapped;
   (c) using the adhesive on the one surface of the paper to adhere the paper to the article while the article is being wrapped to form a package; and
   (d) using the adhesive on the one surface of the paper to adhere the paper to itself to define a package after the article is wrapped.

* * * * *